N. MACNEALE.
LAMP.
APPLICATION FILED JUNE 19, 1919.
1,413,177.
Patented Apr. 18, 1922.
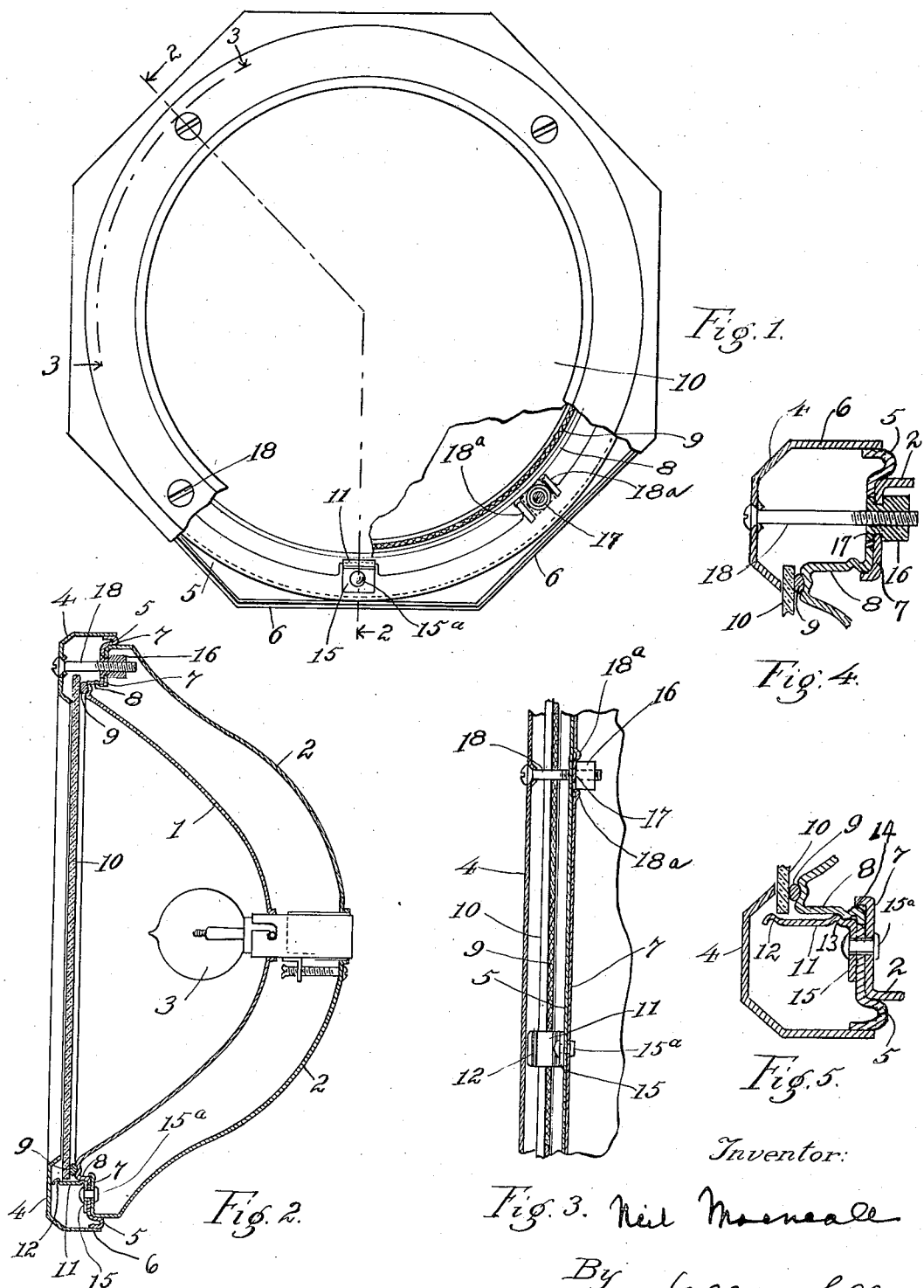

UNITED STATES PATENT OFFICE.

NEIL MACNEALE, OF CINCINNATI, OHIO, ASSIGNOR TO THE CORCORAN-VICTOR COMPANY, OF CINCINNATI, OHIO, A CORPORATION OF OHIO.

LAMP.

1,413,177.  Specification of Letters Patent.  Patented Apr. 18, 1922.

Application filed June 19, 1919. Serial No. 305,326.

*To all whom it may concern:*

Be it known that I, NEIL MACNEALE, a citizen of the United States, and a resident of the city of Cincinnati, in the county of Hamilton and State of Ohio, have invented certain new and useful Improvements in Lamps, of which the following is a full, clear, and exact description, reference being had to the accompanying drawing, forming part of this specification.

My invention relates to lamps for vehicles of the type wherein there is a reflector and shell, a glass, a rim, a suitable source of light and some means of securing the parts together. This is the familiar lamp as used in automobiles and the object of my invention is to provide new and valuable means for securing the reflector, rim and glass to the retaining shell.

According to my invention, the usual spring means for more or less resiliently clamping the rim of the lamp in place on the body is done away with, and the preferred method of mounting consists of screws, inserted through the rim and engaging in the retaining shell. In my invention, I provide further for a simple means of utilizing an octagonal or other flat sided or noncircular rim, together with a cylindrical mounting means on the shell of the lamp.

The above objects and other advantages to be noted I accomplish by that certain construction and arrangement of parts to be hereinafter more specifically pointed out and claimed.

In the drawing,

Figure 1 is a plan view of the front of the lamp, with the parts broken away at one side to show the interior construction.

Figure 2 is a central cross section taken on the line 2, 2, of Figure 1.

Figure 3 is a detail section taken on the line 3, 3, of Figure 1, said line 3, 3, being a curved line as noted.

Figures 4 and 5 are enlarged views of the parts shown at the upper and lower ends respectively of Figure 3.

The lamp has a concave reflector 1 and a similarly shaped shell 2, between which is held in the desired manner the lighting means 3, which in this instance is an electric bulb. The rim 4 is shown as octagonal in shape on the outer edge, in order to illustrate my method of mounting a noncircular rim on a round shell. It will be understood that the selected shape has no necessary importance in my invention.

To fit any desired shape of rim to my lamp body, I equip the shell or body of the lamp with an outwardly extending annular filler plate 5, which conforms to the contour of the depending flange 6 of the lamp rim on its outer edge and is mounted on the inwardly extending supporting flange 7 of the shell or body of the lamp at its inner edge. It can be observed that by varying the shape of the annular filler plate 5 (annular so far as its inner edge is concerned), the shape of the lamp rim can be varied also without affecting the necessity of redesigning the balance of the lamp.

The said plate 5, which is overlapped by the rim or closure of the lamp, is secured by riveting to the flange 7 of the shell 2, and the reflector 1 has an outwardly extending flange 8 which rests on the flange 7 of the shell also.

The flange 8 of the reflector is preferably beaded to receive a cushioning cord 9, and against this cord rests the glass member 10. The rim of the lamp bears against the glass, which holds it in place, and the flange 7 of the shell is equipped with a number of clips 11, which have beads 12 which engage the glass when it is set in place. The clips have also the beads 13 which engage over the outwardly turned edges 14 of the flange 8 of the reflector.

In assembling or opening up the lamp, the reflector and the glass will thus be held in place by means of the clips, prior to the setting in place of the rim, or upon its removal. The base 15 of the clips is preferably held by the retaining rivets 15ª on the flange 7 of the shell, these rivets retaining also the "filler" plate 5.

At a number of points separated from the clips, there are secured in the supporting flange 7 of the shell a series of nuts 16. These nuts are formed with a peripheral slot as shown at 17, and are held in place by forcing them into apertures in the flange 7, so that the aperture walls engage in the slots. The under side of the flange is slightly embossed to provide two ridges 18ª alongside of each aperture, which prevent the nuts 16 from turning.

The reflector is provided with screw holes located with reference to the position of the nuts, and screws 18 are inserted through said holes in the shell and into the nuts. Upon screwing down the screws tightly, the rim will be firmly held in place and will hold in permanent assembly the balance of the parts of the lamp.

This nature of the mounting of a lamp reflector rim will provide for any necessary amount of take-up, since the screws may be tightened down. The difficulty of taking off the rim, which is encountered in other types of lamps with which I am familiar, is done away with, since there are no springs or automatic locking devices. Such spring mountings are very hard for an unexpert to force into and out of place, and, moreover, rarely have any means for clearly indicating whether they are tightly in place or not. With the lamp rims of the type in use today, the driver of a car very frequently loses his glass, because in changing an electric light bulb, or cleaning the lamp he fails to properly replace the rim, resulting in its loss while on the road. In my device, the screws are apparent and any one should be able to tell whether they come into engagement or not.

Having thus described my invention, what I claim as new and desire to secure by Letters Patent, is:—

1. In a lamp, a shell having an open end and an inwardly extending flange at said end, means located in said flange for engaging a series of bolts, a reflector resting on said flange, a lens resting on the reflector, a detachable sheet metal ring engaging the lens, and bolts for engaging the ring and flange, whereby the ring may be bolted down to the flange, thereby securing the reflector and lens in place, said means in the flange for engaging the bolts comprising nuts having slotted ends, and with the flange perforated with holes adapted to permit a snapping of the slotted portion into engagement with the walls of the holes.

2. In a lamp, the combination of a lamp shell, a reflector, and a glass retaining detachable sheet metal ring, of a flange element for the shell extending inwardly to seat the reflector, and a filler plate secured to the flange and extending outwardly to abut the rear periphery of the ring.

3. In a lamp, the combination with a reflector having a circular rim, a lamp shell having a circular open end, means at said end for supporting the reflector, and a retaining ring for the reflector having a polygonal periphery, and a flange element extending outwardly from the circular open end of the lamp shell to a position of abutment with the periphery of the ring and having itself a periphery similar to that of the ring.

4. In a lamp, the combination with a reflector, a shell for supporting the same having a flanged end on which said reflector rests, a lens, a cushion between the lens and the reflector, and a detachable sheet metal ring bearing on the lens, and bolts passing through the ring and engaging the reflector flange and adapted to force the ring toward said flange and thence clamp the lens and reflector together and the reflector against the flange, said flanged end having means in addition to the ring for holding the lens and reflector in place thereon when the ring is removed.

NEIL MACNEALE.